US012115542B2

(12) United States Patent
Min et al.

(10) Patent No.: US 12,115,542 B2
(45) Date of Patent: Oct. 15, 2024

(54) FLUID MICRO-INJECTION DEVICE

(71) Applicant: CHANGZHOU MINGSEAL ROBOT TECHNOLOGY CO., LTD., Changzhou (CN)

(72) Inventors: Jijiang Min, Changzhou (CN); Pei Sun, Changzhou (CN); Yuxin Geng, Changzhou (CN); Dongsheng Qu, Changzhou (CN)

(73) Assignee: CHANGZHOU MINGSEAL ROBOT TECHNOLOGY CO., LTD., Jiangsu (CN)

( * ) Notice: Subject to any disclaimer, the term of this patent is extended or adjusted under 35 U.S.C. 154(b) by 427 days.

(21) Appl. No.: 17/457,480

(22) Filed: Dec. 3, 2021

(65) Prior Publication Data

US 2022/0088621 A1 Mar. 24, 2022

Related U.S. Application Data

(63) Continuation of application No. PCT/CN2020/112090, filed on Aug. 28, 2020.

(30) Foreign Application Priority Data

Jan. 6, 2020 (CN) ......................... 202010011477.5

(51) Int. Cl.
*B05B 1/30* (2006.01)
*B05C 5/02* (2006.01)

(52) U.S. Cl.
CPC .............. *B05B 1/30* (2013.01); *B05C 5/0225* (2013.01)

(58) Field of Classification Search
CPC .. B05B 1/3046; B05C 5/0225; B05C 11/1034
(Continued)

(56) References Cited

U.S. PATENT DOCUMENTS 4,273,257 A * 6/1981 Smith ................. B05B 11/1007 422/934
2015/0300748 A1* 10/2015 Hong ...................... F04B 13/00 165/287

(Continued)

FOREIGN PATENT DOCUMENTS

CN 102950071 3/2013
CN 109433448 3/2019

(Continued)

OTHER PUBLICATIONS

Notice of Final Rejection of KR Corresponding Application 10-2021-7037249 issued on Dec. 28, 2023 from the KIPO and its English translation.

(Continued)

*Primary Examiner* — Cody J Lieuwen
(74) *Attorney, Agent, or Firm* — Grossman, Tucker, Perreault & Pfleger, PLLC

(57) ABSTRACT

A fluid micro-injection device including an execution system, a fluid channel assembly and a movable unit. The execution system includes: a base body defining an executor mounting chamber and an adjustor mounting chamber; an executor; an adjusting seat, at least a portion of the adjusting seat extending through the positioning hole and into the adjustor mounting chamber, and the adjusting seat being provided with a channel; and an adjustor, at least a portion of the adjustor being connected with the adjusting seat to adjust the distance between the adjusting seat and the executor. The fluid channel assembly includes: a fluid seat detachably connected with the base body. At least a portion of the movable unit is provided on the adjusting seat.

19 Claims, 11 Drawing Sheets

(58) Field of Classification Search
USPC .......................................................... 239/569
See application file for complete search history.

(56) References Cited

U.S. PATENT DOCUMENTS

| | | | | |
|---|---|---|---|---|
| 2018/0311697 | A1* | 11/2018 | MacIndoe | B05C 5/0225 |
| 2021/0018353 | A1* | 1/2021 | Fliess | G01F 11/44 |
| 2021/0023585 | A1* | 1/2021 | Fliess | H10N 30/883 |
| 2022/0280967 | A1* | 9/2022 | Fliess | B05C 5/001 |

FOREIGN PATENT DOCUMENTS

| | | | | |
|---|---|---|---|---|
| CN | 109604084 | | 4/2019 | |
| CN | 109718966 | | 5/2019 | |
| CN | 209772439 | | 12/2019 | |
| CN | 111068951 | | 4/2020 | |
| EP | 3335805 | A1 * | 6/2018 | B05C 5/0225 |
| JP | 2006246263 | A | 9/2006 | |
| WO | 2018118686 | | 6/2018 | |
| WO | 2019057542 | A1 | 3/2019 | |

OTHER PUBLICATIONS

Office action of VN Corresponding Application 1-2021-07857 issued on Jan. 31, 2024 from the Intellectual Property Office of Vietnam (IP Office) and its English translation.
Request for the Submission of an Opinion from corresponding Korean Appln. No. 10-2021-7037249 dated Jun. 22, 2023 English Translation Attached.
International Search Report from corresponding PCT Appln. No. PCT/CN2020/112090 dated Nov. 30, 2020.

* cited by examiner

FLUID MICRO-INJECTION DEVICE

CROSS REFERENCE OF RELATED APPLICATION

The present disclosure is a continuation of the International Application No. PCT/CN2020/112090 filed on Aug. 28, 2020 which claims the priority of the Chinese patent application No. 202010011477.5 entitled "FLUID MICRO-INJECTION DEVICE" and filed by CHANGZHOU MINGSEAL ROBOT TECHNOLOGY CO., LTD. on Jan. 6, 2020, both of which are hereby incorporated by reference in their entirety.

FIELD

The present disclosure relates to a fluid micro-injection device.

BACKGROUND

In a current fluid micro-injection device, a swivel nut is usually provided between the fluid micro-injection device and a member to be processed. By screwing the swivel nut, the positional relation and contact force between a nozzle and a closing element can be adjusted. Since the space for adjustment is quite limited and view of sight is often easily blocked, when using a specific tool for adjustment, a low efficiency for adjustment and operation inconvenience would occur.

SUMMARY

The present disclosure aims to solve at least one of the technical problems in the prior art.

To this end, the present disclosure provides a fluid micro-injection device, which has advantages such as easy to operate, high efficiency for assembly, disassembly and cleaning, and improvement in convenience for adjusting the distance and contact force between the movable element and the nozzle.

The fluid micro-injection device according to an embodiment of the present disclosure may include: an execution system, an fluid channel assembly and a movable unit. The execution system includes: a base body defining therein an executor mounting chamber and an adjustor mounting chamber, the base body being provided with a positioning hole in communication with the executor mounting chamber; an executor movably provided in the executor mounting chamber, at least a portion of the executor extending into the adjustor mounting chamber; an adjusting seat, at least a portion of the adjusting seat extending through the positioning hole and into the adjustor mounting chamber, and the adjusting seat being provided with a channel in communication with the executor mounting chamber; and an adjustor movably provided in the adjustor mounting chamber, at least a portion of the adjustor being connected with the adjusting seat to adjust the distance between the adjusting seat and the executor. The fluid channel assembly includes: a fluid seat defining therein a fluid chamber and a fluid channel in communication with the fluid chamber, the base body being detachably connected with the fluid seat; a nozzle provided on the fluid seat and in communication with the fluid chamber; and a fluid supply joint in communication with the fluid channel to supply fluid to the nozzle through the fluid channel and the fluid chamber. The movable unit is provided between the base body and the fluid seat, at least a portion of the movable unit is inserted into the positioning hole to be connected with the executor and to be driven by the executor to move along an axis of the positioning hole to open and close the nozzle, and at least a portion of the movable unit is provided on the adjusting seat to be adjusted by the adjusting seat.

In the fluid micro-injection device according to embodiments of the present disclosure, the execution system, the fluid channel assembly and the movable unit operate cooperatively, the base body, the executor, the adjusting seat and the adjustor operate cooperatively in the execution system, the adjusting seat for the adjustor is connected with the movable unit, and by the upward or downward adjustment of the position of the adjusting seat, the movable unit is driven to move along the axis of the positioning hole, to enable adjustment of the distance and contact force between the nozzle and the lower end of the movable unit.

According to an embodiment of the present disclosure, the base body is provided with an adjusting hole in communication with the adjustor mounting chamber, an upper end of the adjustor extends out of the adjusting hole, and a lower end of the adjustor is connected with the adjusting seat.

According to an embodiment of the present disclosure, the adjustor mounting chamber is formed as a chamber which extends in a vertical direction and which is open at both upper and lower ends thereof, the adjustor mounting chamber is open at its upper end to form the adjusting hole, the adjustor mounting chamber is open at its lower end to form the positioning hole, and the adjustor is connected with the adjusting seat to drive the adjusting seat to move in the vertical direction.

According to an embodiment of the present disclosure, the adjustor is in a columnar shape extending along an axial direction of the adjustor mounting chamber, the lower end of the adjustor is provided with a screw pin, a part of the adjusting seat extending into the adjustor mounting chamber is provided with a screw hole corresponding to the screw pin, and the adjustor is rotatable along its axis to drive the adjusting seat to move in the vertical direction.

According to an embodiment of the present disclosure, the adjusting seat includes: an adjusting seat body which is in a columnar shape extending along the axial direction of the adjustor mounting chamber and which is inserted into the adjustor mounting chamber, the adjusting seat body being provided therein with a first pore channel extending along its axial direction, an upper end of the movable unit extending into the first pore channel, an upper end of the adjusting seat body being provided with a screw hole, a lateral part of the adjusting seat body being provided with an avoiding slot in communication with the first pore channel, and one end of the lever of the executor extends through the avoiding slot to be connected with the movable element; and a connection portion connected with the adjusting seat body and provided at a lower end of the base body, the connection portion being configured to be connected with the fluid channel assembly of the fluid micro-injection device, the connection portion is provided therein with a second pore channel which is coaxial with and in communication with the first pore channel, and the second pore channel cooperating with the first pore channel to form the channel According to an embodiment of the present disclosure, the inner surface of the adjustor mounting chamber is provided with a restriction boss, the restriction boss extends along a circumferential direction of the inner surface and is located below the lever. The execution system further includes: a positioning seat provided in the executor mounting chamber, the positioning seat being in a columnar shape extending along the axial direction of the executor mounting chamber, an upper end of the positioning seat being provided with a circular boss extending along its circumferential direction, the circular boss pressing against the restriction boss, the positioning seat being provided with a third pore channel extending therethrough along its axial direction, and the upper end of the movable unit extending through the third pore channel to be connected with the lever; and a first elastic element provided between the lever and the positioning seat, two ends of the first elastic element pressing against the lever and the positioning seat respectively.

According to an embodiment of the present disclosure, the fluid seat defines therein an installation chamber in communication with the fluid chamber. The movable unit includes: a guiding seat which is in a columnar shape, the guiding seat defining therein a guiding hole, the guiding hole extending through the guiding seat along the axial direction of the guiding seat, an lower end of the guiding seat being configured to be detachably installed into the installation chamber, and other parts of the guiding seat being configured to extend into the positioning hole when assembling the fluid channel assembly with the execution system; a movable element which is movable along an axial direction of the guiding seat, a lower end of the movable element extending through and out of the guiding hole along the axial direction of the guiding seat, an upper end of the movable element being located above the guiding seat, the upper end of the movable element being configured to extend through the channel and into the adjustor mounting chamber to be connected with at least a portion of the executor and to be controlled by the executor to move along the axial direction of the guiding hole when assembling the execution system with the fluid channel assembly, the lower end of the movable element cooperating with the nozzle to open and close the nozzle, and the adjustor being configured to adjust the movement of the adjusting seat along the axial direction of the movable element and to drive the movable element to move along its axial direction; and a second elastic element provided between the upper end of the guiding seat and the upper end of the movable element, two ends of the second elastic element pressing against the upper end of the guiding seat and the upper end of the movable element respectively.

According to an embodiment of the present disclosure, an upper part of the guiding seat is in a cylindrical shape, the upper end of the guiding seat is provided with a positioning pin which is coaxial with the guiding seat and has a radial size smaller than that of the guiding seat, the first elastic element is a spring sheathed on the positioning pin, the positioning hole is a cylindrical hole, and an outer circumferential surface of the upper part of the guiding seat is in close contact with the inner surface of the positioning hole when assembling the guiding seat with the base body.

According to an embodiment of the present disclosure, the movable element includes: a cylindrical shaft, provided in the guiding hole and movable along its axial direction, and an lower end of the cylindrical shaft being formed as a sphere head; and an upper end platform provided at an upper end of the cylindrical shaft, the upper end platform having a size greater than the radius of the cylindrical shaft, the second elastic element being provided between the upper end platform and the guiding seat.

According to an embodiment of the present disclosure, the execution system may further include a restrictor provided on the base body and connected with at least a portion of the adjustor and/or the adjusting seat. The restrictor is configured to at least restrict a position of the adjusting seat moving along the axial direction of the movable unit or a position of the adjustor.

According to an embodiment of the present disclosure, the adjustor is provided with a recess extending along a circumferential direction of the adjustor. The restrictor may include a first restriction portion provided on the base body and positioned in the adjustor mounting chamber. At least a portion of the first restriction portion is inserted into the recess to restrict the position of the adjustor.

According to an embodiment of the present disclosure, the number of the avoiding slots is two and the two avoiding slots are provided at opposite sides of the adjusting seat body. The restrictor includes a second restriction portion provided on the base body. At least a portion of the second restriction portion extends through the avoiding slot to restrict the position of the adjusting seat moving along the axial direction of the movable element.

According to an embodiment of the present disclosure, an inner surface of the adjustor mounting chamber is provided with a circular subsidence groove extending along a circumferential direction of the inner surface, a radial size of an opening at a lower end of the groove is smaller than a radial size of an upper end of the adjusting seat body. The execution system further includes a compressing spring provided in the subsidence groove. The compressing spring is an elastic element, and two ends of the compressing spring are compressed against a top surface of the subsidence groove and an upper end surface of the adjusting seat respectively.

Additional aspects and advantages of the present disclosure will be given at least in part in the following description, or become apparent at least in part from the following description, or can be learned from practicing of the present disclosure.

BRIEF DESCRIPTION OF DRAWINGS

The above and/or additional aspects and advantages of the present disclosure will become clear and easy to understand from the description of embodiments below in conjunction with the accompanying drawings, in which.

REFERENCE NUMERALS

Figure 1:
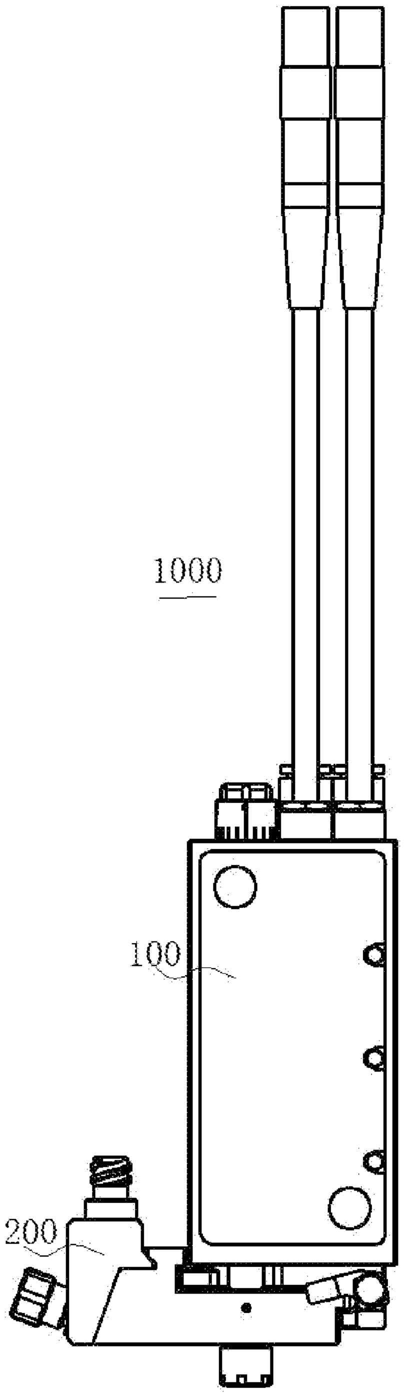
FIG. 1 is a schematic view illustrating a structure of a fluid micro-injection device according to an embodiment of the present disclosure.
Figure 2:
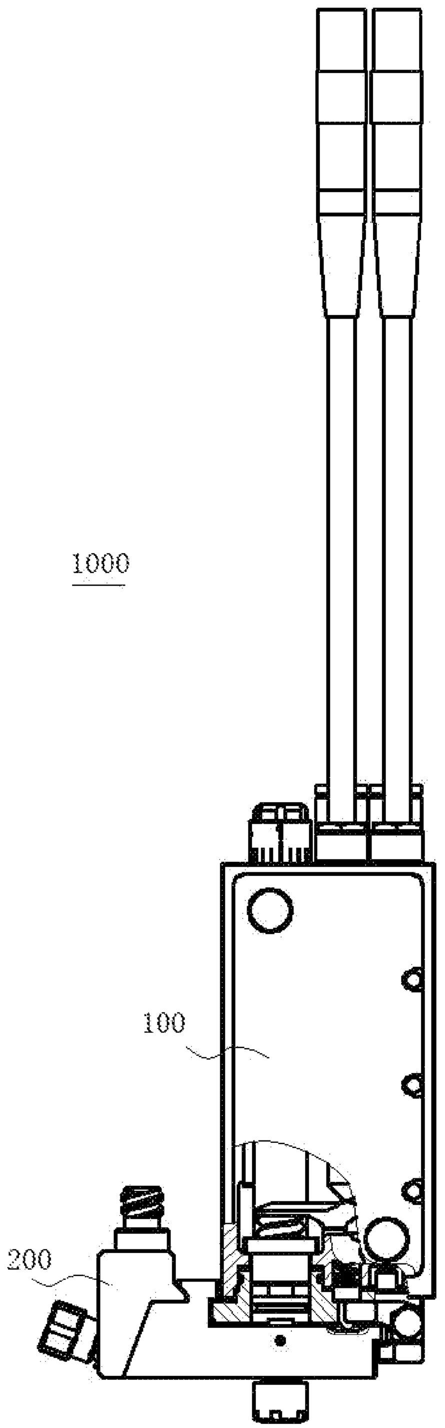
FIG. 2 is a sectional view illustrating a part of the fluid micro-injection device according to an embodiment of the present disclosure.
Figure 3:
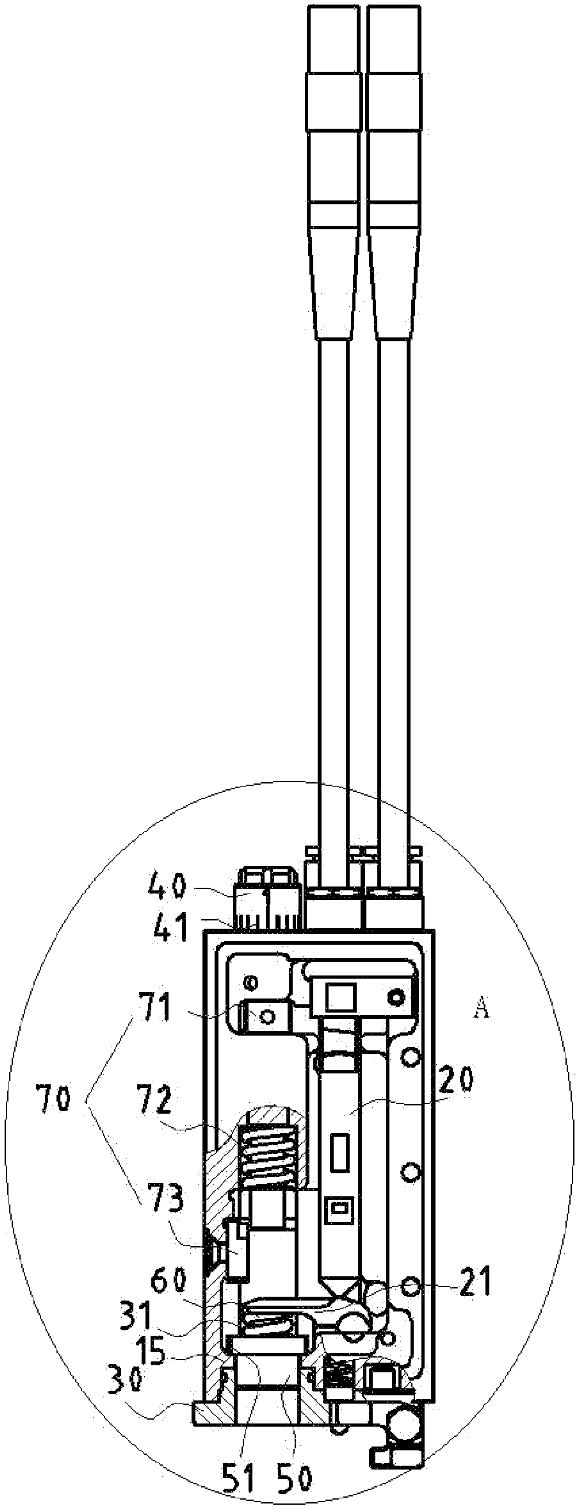
FIG. 3 is a schematic view illustrating a structure of an execution system of the fluid micro-injection device according to an embodiment of the present disclosure.
Figure 4:
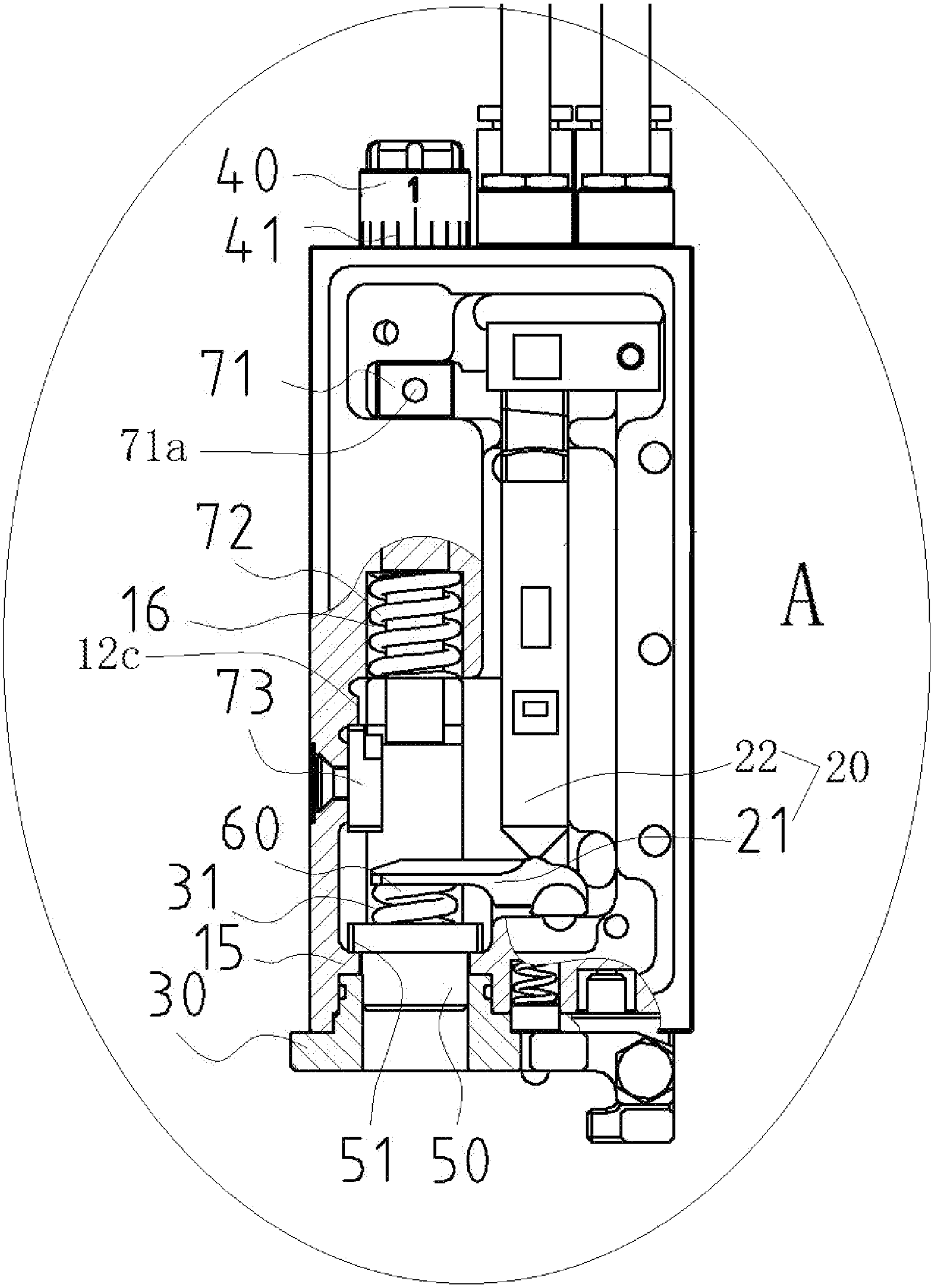
FIG. 4 is an enlarged view illustrating area A in FIG. 3.
Figure 5:
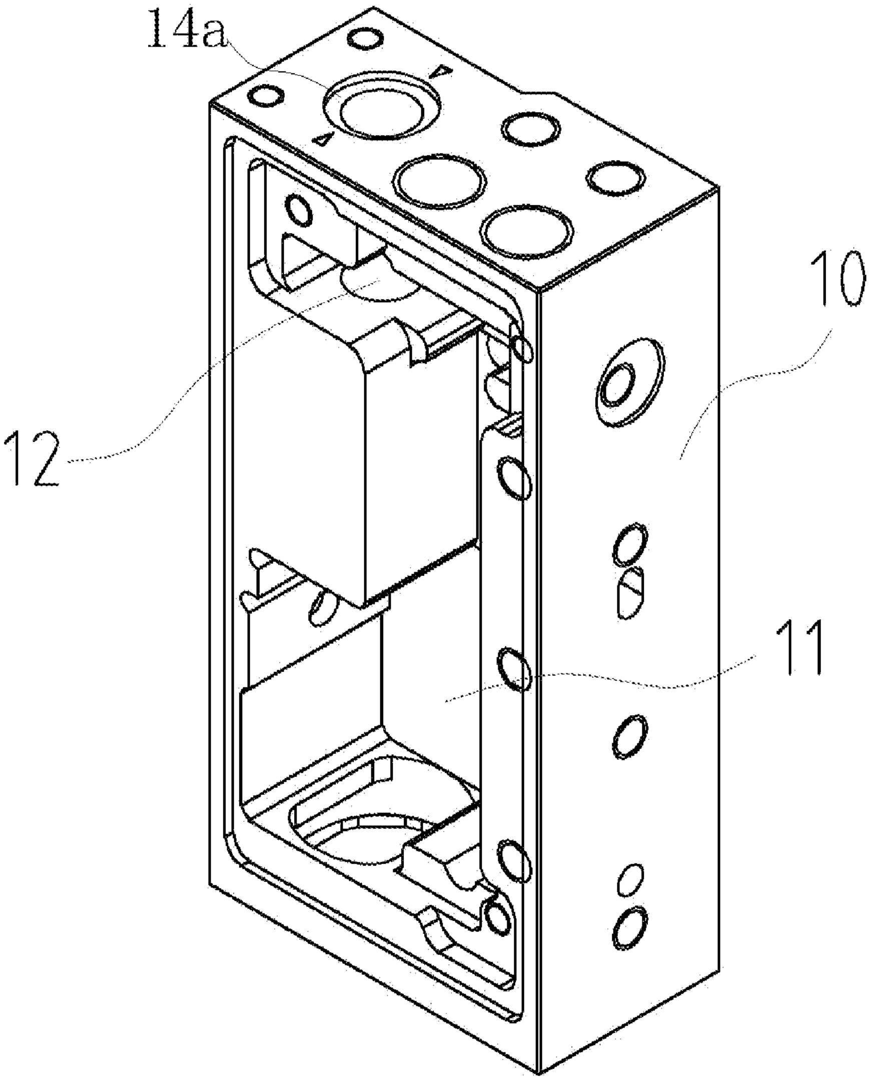
FIG. 5 is a schematic view illustrating a structure of a base body of the fluid micro-injection device according to an embodiment of the present disclosure.
Figure 6:
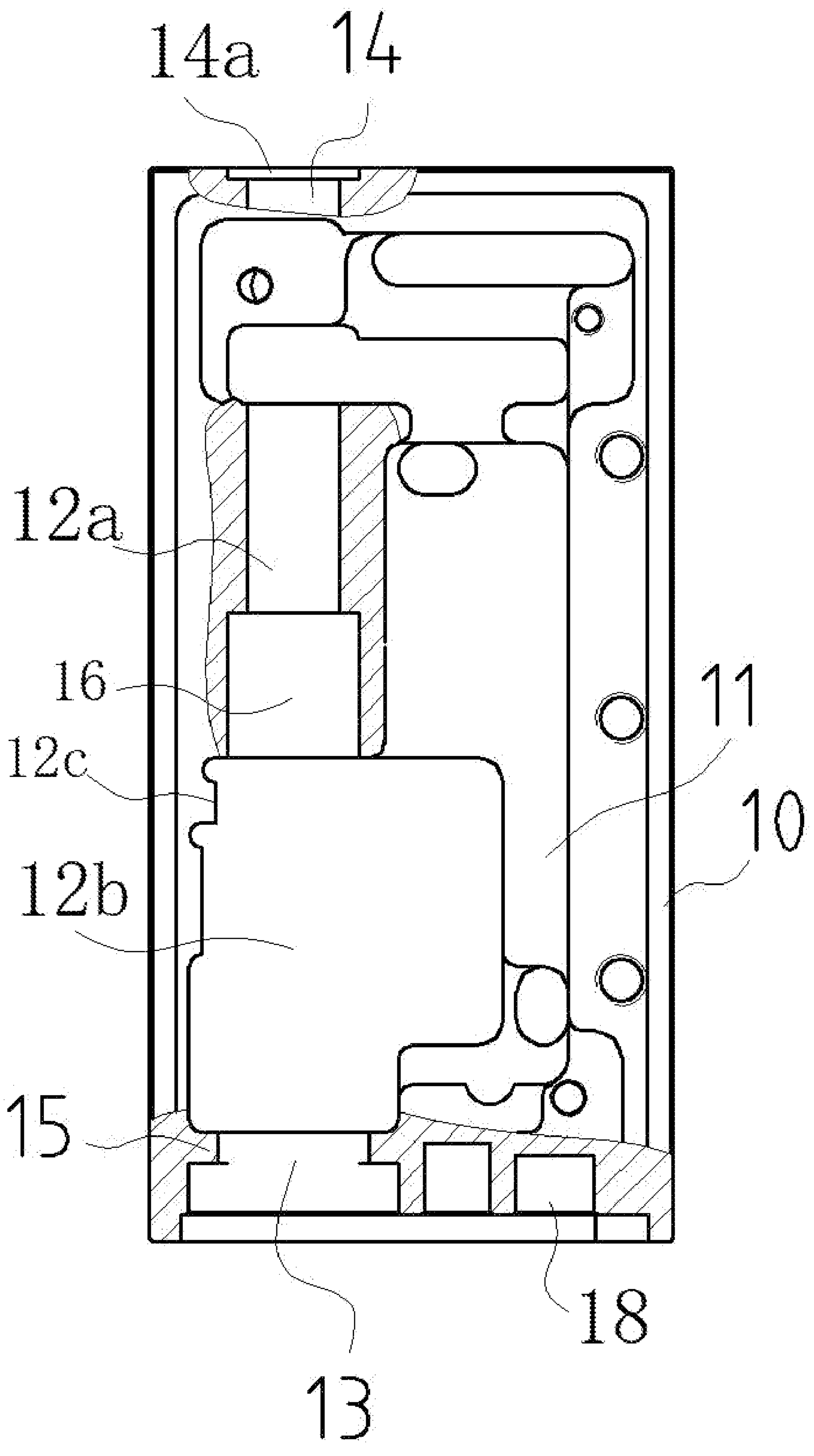
FIG. 6 is a sectional view illustrating a part of the base body of the fluid micro-injection device according to an embodiment of the present disclosure.
Figure 7:
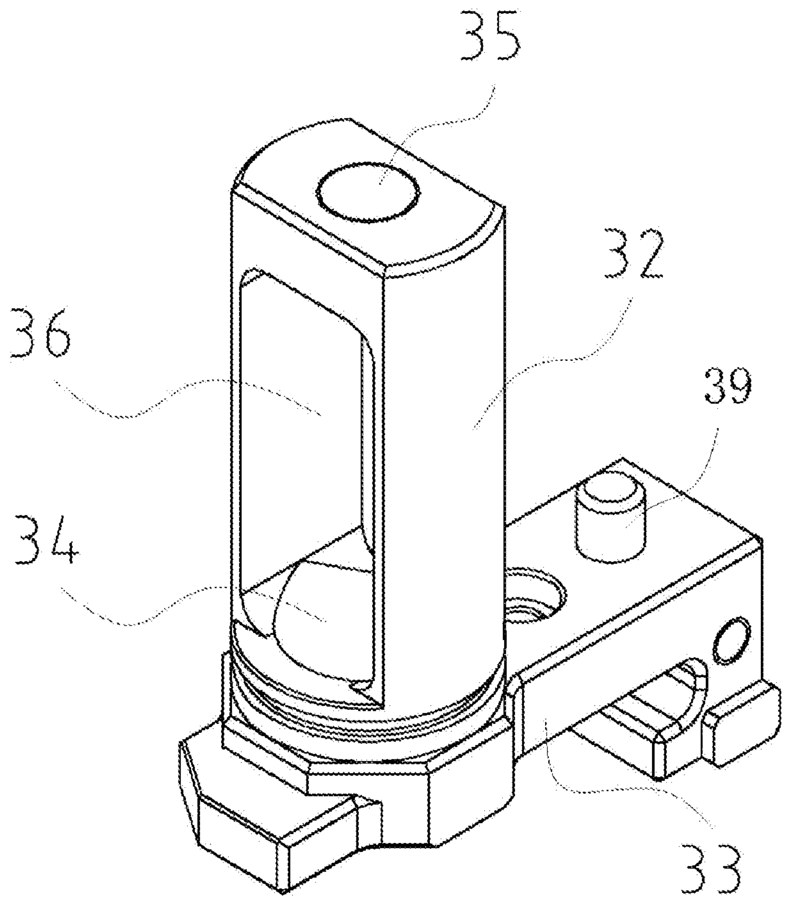
FIG. 7 is a schematic view illustrating a structure of an adjusting seat of the fluid micro-injection device according to an embodiment of the present disclosure.
Figure 8:
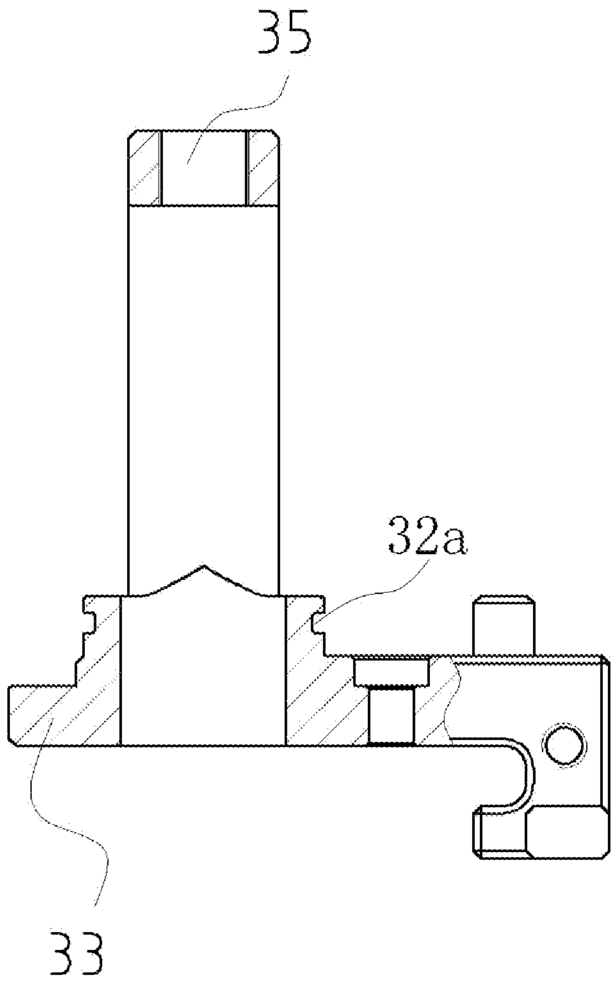
FIG. 8 is a sectional view illustrating a part of the adjusting seat of the fluid micro-injection device according to an embodiment of the present disclosure.

Fluid micro-injection device 1000;
Execution system 100;
Base body 10; Executor mounting chamber 11;
Adjustor mounting chamber 12; Adjusting hole 12*a*; Adjusting seat mounting chamber 12*b;*
Protruding part 12*c;*
Positioning hole 13;
Adjusting hole 14; Subsidence groove 14*a;*
Restriction boss 15; Circular subsidence groove 16; Positioning recess 18;
Executor 20; Lever 21; Actuator 22;
Adjusting seat 30; Channel 31;
Adjusting seat body 32; Sealing recess 32*a;*
Connection portion 33; First pore channel 34; Screw hole 35; Avoiding slot 36; Positioning portion 39;
Adjustor 40; Scale mark 41; Recess 42;
Positioning seat 50; Circular boss 51;
First elastic element 60;
Restrictor 70;
First restriction portion 71; Screw hole 71*a;*
Compressing spring 72;
Second restriction portion 73; Mounting plate 73*a*; Restriction plate 73*b;*
Fluid channel assembly 200;
Fluid seat 210; Fluid chamber 211; Fluid channel 212; Installation chamber 213;
Nozzle 220;
Fluid supply joint 230;
Movable unit 300;
Guiding seat 310; Guiding hole 311;
Movable element 320; Cylindrical shaft 321; Upper end platform 322;
Second elastic element 330.

DETAILED DESCRIPTION

Embodiments of the present disclosure will be described hereinafter in detail. Examples of the embodiments are illustrated in the drawings, throughout which the same or similar reference numerals refer to the same or similar elements or elements having the same or similar functions. The embodiments described below with reference to the accompanying drawings are illustrative to explain the present disclosure and should not be construed as being limited to the present disclosure.

In the description of the present disclosure, it should be understood that terms "center", "longitudinal", "transverse", "length", "width", "thickness", "upper", "lower", "front", "back", "left", "right", "vertical", "horizontal", "top", "bottom", "inside", "outside", "clockwise", "counterclockwise", "axial", "radial", "circumferential" and the like refer to orientation or positional relationship based on the orientation or positional relationship shown in the drawings. Those merely intend to describe the present disclosure and simplify description, and do not indicate or imply that the indicated devices or components must be constructed and operated in a particular orientation. Therefore, the above cannot be construed as being limited to the present disclosure. Furthermore, features defining "first" and "second" may explicitly or implicitly include one or more features. In the description of the present disclosure, "plurality" means two or more, unless otherwise stated.

In the description of the present disclosure, it should be noted that the terms "installation", "attached", and "connected" should be understood widely, and for example, the terms may refer to be fixedly or detachable or integrally connected; mechanical or electrical connection; directly connected, or indirectly connected through an intermediate medium, or internal communication of two components, unless otherwise explicitly stated and defined. The specific meaning of the above terms in the present disclosure can be understood in a specific case by those skilled in the art.

According to an embodiment of the present disclosure, a fluid micro-injection device 1000 may be specifically described below with reference to drawings.

As illustrated in FIG. 1 to FIG. 14, the fluid micro-injection device 1000 according to the embodiment of the present disclosure includes an execution system 100, a fluid channel assembly 200 and a movable unit 300. The execution system 100 includes a base body 10, an executor 20, an adjusting seat 30 and an adjustor 40. The fluid channel assembly 200 includes a fluid seat 210, a nozzle 220 and a fluid supply joint 230.

In particular, the base body 10 defines therein an executor mounting chamber 11 and an adjustor mounting chamber 12. The base body 10 is provided with a positioning hole 13 in communication with the executor mounting chamber 11. The executor 20 is movably provided in the executor mounting chamber 11 and at least a portion of the executor 20 extends into the adjustor mounting chamber 12. At least a portion of the adjusting seat 30 extends through the positioning hole 13 and into the adjustor mounting chamber 12. The adjusting seat 30 is provided with a channel 31 in communication with the executor mounting chamber 11. The adjustor 40 is movably provided in the adjustor mounting chamber 12, and at least a portion of the adjustor 40 is connected with the adjusting seat 30 to adjust the distance between the adjusting seat 30 and the executor 20. The fluid seat 210 defines therein a fluid chamber 211 and a fluid channel 212 in communication with the fluid chamber 211. The base body 10 is detachably connected with the fluid seat 210. The nozzle 220 is provided on the fluid seat 210 and in communication with the fluid chamber 211. The fluid supply joint 230 is in communication with the fluid channel 212 to supply fluid to the nozzle 220 through the fluid channel 212 and the fluid chamber 211. The movable unit 300 is provided between the base body 10 and the fluid seat 210, at least a portion of the movable unit 300 is inserted into the positioning hole 13 to be connected with the executor 20 and driven by the executor 20 to move along an axis of the positioning hole to open and close the nozzle 220, and at least a portion of the movable unit 300 is provided on the adjusting seat 30 to be adjusted by the adjusting seat 30.

In other words, the fluid micro-injection device 1000 according to the embodiment of the present disclosure mainly consists of the execution system 100, the fluid channel assembly 200 and the movable unit 300. The execution system 100 mainly consists of the base body 10, the executor 20, the adjusting seat 30 and the adjustor 40. The fluid channel assembly 200 mainly consists of the fluid seat 210, the nozzle 220 and the fluid supply joint 230. The fluid channel assembly 200 is provided below the execution system 100, and the movable unit 300 is provided between the execution system 100 and fluid channel assembly 200. In particular, the base body 10 defines therein the executor mounting chamber 11 and the adjustor mounting chamber 12, the executor 20 is installed in the executor mounting chamber 11, and at least a portion of the executor 20 extends into the adjustor mounting chamber 12. The executor 20 cooperates with the movable unit 300 to perform flow control for the nozzle 220. The adjustor 40 is installed in the adjustor mounting chamber 12 to adjust the position of the movable unit 300 along its axial direction. In particular, the base body 10 is provided with the positioning hole 13 in communication with the executor mounting chamber 11, at least a portion of the adjusting seat 30 extends through the positioning hole 13 and into the adjustor mounting chamber 12, and the movable unit 300 is able to extend through the channel 31 on the adjusting seat 30 and into the adjustor mounting chamber 12 to be connected with at least a portion of the executor 20. When the adjustor 40 drives the adjusting seat 30 to move along the axial direction of the movable unit 300, since the adjusting seat 30 is connected with the movable unit 300, the position of the movable unit 300 along its axial direction can be adjusted to realize adjustment of distance between the movable unit 300 and the nozzle of the fluid micro-injection device.

Thus, the fluid micro-injection device 1000 according to the embodiment of the present disclosure includes the execution system 100, the fluid channel assembly 200 and the movable unit 300. In the execution system 100, the base body 10, the executor 20, the adjusting seat 30 and the adjustor 40 cooperate with each other. Since the adjusting seat 30 of the adjustor 40 is connected with the movable unit 300, by adjusting the position of the adjusting seat 30 in the vertical direction, the movable unit 300 is driven to move along the axis of the positioning hole 13 to adjust the distance and contact force between the lower end of the movable unit 300 and the nozzle 220.

In some specific embodiments of the present disclosure, the execution system 100 of the fluid micro-injection device according to the embodiment of the present disclosure may further include a restrictor 70. The restrictor 70 may be provided on the base body 10 and connected with at least a portion of the adjustor 40 and/or the adjusting seat 30. The restrictor 70 can restrict at least the position of the adjusting seat 30 moving along the axial direction of the movable unit 300 or the position of the adjustor 40. By restricting the position of the adjusting seat 30 moving along the axial direction of the movable unit 300, the displacement range of the adjusting seat 30 can be restricted, preventing the adjusting seat 30 from going beyond the displacement strokemm By restricting the position of the adjustor 40, the adjustor 40 can be prevented from shifting during the adjustment to improve the adjustment accuracy.

By the cooperation of the restrictor 70 with the adjustor 40 and/or the adjusting seat 30, e.g., by cooperation of the restrictor 70 with the adjustor 40, the position of the adjustor 40 can be restricted to prevent the adjustor 40 from deviating from a predetermined position so as to improve the adjustment accuracy, and to prevent the adjustor 40 from getting off the base body. When the restrictor 70 cooperates with the adjusting seat 30, the moving position and moving distance of the adjusting seat 30 can be restricted to prevent the adjusting seat 30 from going beyond a predetermined movement strokemm By the cooperation of the restrictor 70 with the adjusting seat 30 and the adjustor 40 respectively, restriction function for the adjusting seat 30 and the adjustor 40 can be achieved. The execution system 100 of the fluid micro-injection device according to the embodiment of the present disclosure can thus have advantages such as a good positioning effect, high adjustment accuracy and ease in adjustment.

In the execution system 100 of the fluid micro-injection device according to the embodiment of the present disclosure, by the cooperation of the restrictor 70 with the adjustor 40 and/or the adjusting seat 30, e.g., by the cooperation of the restrictor 70 with the adjustor 40, the position of the adjustor 40 can be restricted to prevent the adjustor 40 from deviating from a predetermined position so as to improve the adjustment accuracy, and to prevent the adjustor 40 from getting off the base body. When the restrictor 70 cooperates with the adjusting seat 30, the moving position and moving distance of the adjusting seat 30 can be restricted to prevent the adjusting seat 30 from going beyond a predetermined movement strokemm. By the cooperation of the restrictor 70 with the adjusting seat 30 and the adjustor 40 respectively, restriction function for the adjusting seat 30 and the adjustor 40 can be achieved. The execution system 100 of the fluid micro-injection device according to the embodiment of the present disclosure can thus have advantages such as a good positioning effect, high adjustment accuracy and ease in adjustment.

According to an embodiment of the present disclosure, the base body 10 is provided with an adjusting hole 14 in communication with the adjustor mounting chamber 12, an upper end of the adjustor 40 extends out of the adjusting hole 14, and a lower end of the adjustor 40 is connected with the adjusting seat 30. That is, when in use, the position of the adjusting seat 30 can be adjusted directly by the adjustor 40 extending out of the adjusting hole 14. The adjusting hole 14 may be provided at any of a plurality of positions on the base body 10, e.g., at the upper part or lateral part. By configuring the adjustor 40 as a corresponding structure, the movable unit 300 can be adjusted in the axial direction, for example, by using a steering structure. An upper end of the adjusting hole 14 may be provided with a subsidence groove **14*a* extending along the inner surface of the adjusting hole 14, a sealing ring may be provided in the subsidence groove 14*a* within the adjusting hole 14, and the upper end of the adjustor 40 may extend through the sealing ring and into the adjustor mounting chamber 12. The sealing ring can provide a sealing effect, and a bottom surface of the subsidence groove 14*a* may be in close contact with the sealing ring to effectively prevent the cooling gas in the valve from leaking from the adjusting hole 14. Meanwhile, the adjustor 40** when adjusted to a predetermined position would not become loose by pressing the sealing ring to produce a counter elastic force.

The part of the upper end of the adjustor 40, which extends out of the adjusting hole 14, may be provided with notches which are in a flower typed configuration as a whole, facilitating using a matched tool to adjust the adjustor 40. The notches may be distributed uniformly and circumferentially. The number of notches may be two or more, and may be an even number.

The upper end of the adjustor 40 may be provided with a step part. A lower end surface of the step part may cooperate with an upper end surface of the base body 10. The lower end surface of the step part may be in close contact with the upper end surface of the base body 10 all the time. Through the close contact, the sealing ring in the subsidence groove 14*a* may be tightly pressed to produce a counter elastic force. Thus, the adjustor 40, after adjusted to a predetermined position, will not become loose.

Preferably, the adjustor mounting chamber 12 is formed as a chamber which extends in a vertical direction and which is open at both upper and lower ends thereof. The adjustor mounting chamber 12 is open at its upper end to form the adjusting hole 14, the adjustor mounting chamber 12 is open at its lower end to form the positioning hole 13, and the adjusting seat 30 is movable in the vertical direction in the positioning hole 13. The adjustor 40 is connected with the adjusting seat 30 to drive the adjusting seat 30 to move in the vertical direction. By providing the chamber which is open at both upper and lower ends thereof, the structure is greatly simplified and manufacture cost is reduced. The position of the adjusting seat 30 can be adjusted quickly and conveniently by the adjustor 40 without any transmission structure.

Optionally, the adjustor 40 is in a columnar shape extending along an axial direction of the adjustor mounting chamber 12. The lower end of the adjustor 40 is provided with a screw pin. A part of the adjusting seat 30 extending into the adjustor mounting chamber 12 is provided with a screw hole 35 corresponding to the screw pin. The adjustor 40 is rotatable around its axis to drive the adjusting seat 30 to move in the vertical direction. In other words, the position of the adjustor 40 relative to the base body 10 may be fixed. When the adjustor 40 is rotated, the adjusting seat 30 may move up or up relative to the adjustor 40 to adjust the adjusting seat 30 upward or downward, so as to drive the movable unit 300 to move in the vertical direction.

Figure 14:
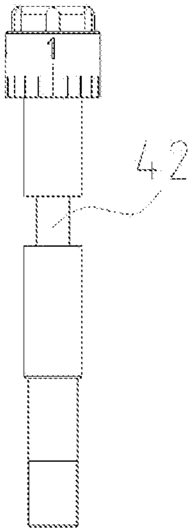
FIG. 14 is a schematic view illustrating a structure of the adjustor of the execution system of the fluid micro-injection device according to an embodiment of the present disclosure.

As illustrated in FIG. 14, in some specific embodiments of the present disclosure, the adjustor 40 is provided with a recess 42 extending along a circumferential direction of the adjustor 40. The restrictor 70 includes a first restriction portion 71. The first restriction portion 71 is provided on the base body 10 and positioned in the adjustor mounting chamber 12. At least a portion of the first restriction portion 71 is inserted into the recess 42 to restrict the position of the adjustor 40.

Figure 9:
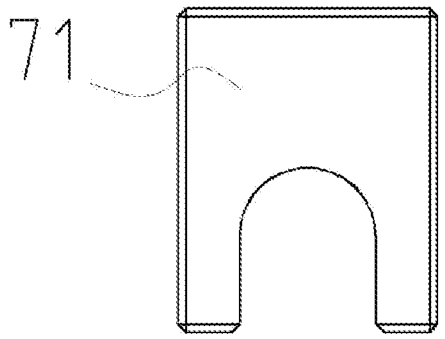
FIG. 9 is a schematic view illustrating a structure of a first restriction portion of the fluid micro-injection device according to an embodiment of the present disclosure.

The right side of the recess 42 may be in communication with the executor mounting chamber 11. An upper end surface of the recess 42 may cooperate with an upper end surface of the first restriction portion 71 to restrict the displacement of the first restriction portion 71 in the axial direction. Through cooperation of the first restriction portion 71 with the recess 42, the adjustor 40 can be prevented from being disengaged from the adjusting hole 14. As illustrated in FIG. 9, the first restriction portion 71 may be formed as a U-shaped element with an opening. An inner surface of the U-shaped element may cooperate with an inner surface of the recess 42, thereby not only fixing the relative position between the first restriction portion 71 and the adjustor 40, but also allowing the adjustor 40 to rotate around the axis. The first restriction portion 71 may be provided with a screw hole 71*a* at the side opposite to the opening of the first restriction portion 71. When detached, the first restriction portion 71 may be detached or installed by screwing a screw into screw hole 71*a*.

According to an embodiment of the present disclosure, an inner surface of the adjustor mounting chamber 12 may be provided with a circular subsidence groove 16 extending along a circumferential direction of the inner surface. An opening at a lower end of the subsidence groove 16 may have a radial size smaller than that of an upper end of the adjusting seat body 32, and the upward movement of the adjusting seat body 32 may be restricted by the outer edge of the subsidence groove 16. The execution system 100 may further include a compressing spring 72 provided in the subsidence groove 16. The compressing spring 72 is an elastic element, and two ends of the compressing spring 72 are compressed against a top surface of the subsidence groove 16 and an upper end surface of the adjusting seat 30 respectively. When the adjustor drives the adjusting seat 30 to move upwardly, the upper end of the adjusting seat body 32 presses against the outer edge of the subsidence groove 16, preventing the upward adjustment from going beyond an adjustment range or preventing an over-adjustment. In addition, the adjusting seat body 32 is always under a downward acting force from the compressing spring 72, thus increasing the stability of the downward movement of the adjusting seat 30. The outer edge of the subsidence groove 16 may be formed as a flat surface cooperating with the upper end surface of the adjusting seat body 32. When rotating the adjustor 40, the compression extent of the compressing spring 72 can be determined according to easiness of rotating.

The adjustor mounting chamber 12 may have an adjusting hole 12*a* positioned between the recess 42 and the subsidence groove 16. A lower end of the adjusting hole 12*a* may be in communication with the subsidence groove 16. An upper end of the adjusting hole 12*a* may be in communication with the recess 42. The adjusting hole 12*a* may cooperate with the corresponding portion of the adjustor 40. The adjustor 40 may rotate in the adjusting hole 12*a* around its axial direction.

The compressing spring 72 has advantages such as having a broad resource and low cost. An upper end surface of the compressing spring 72 may be perpendicular to its axis, and may be in close contact with the top of the subsidence groove 16, thus the position of the upper end surface of the compressing spring can be effectively fixed, and the compressing spring 72 can transfer a counter force to the adjusting seat 30 to guarantee a stable force. A lower end surface of the compressing spring 71 may be perpendicular to its axis and may be in close contact with the upper flat surface of the adjusting seat 30 to transfer the force acting on the adjusting seat 30 and to allow the adjusting seat 30 to reach a corresponding position in time. The outer diameter of the compressing spring 72 may fit with the inner radial dimension of the subsidence groove 16 to guarantee the positional stability of the compressing spring 72.

Further, the upper end of the adjustor 40 may extend out of the adjusting hole 14 to be formed as an adjusting portion, and the adjusting portion is provided with scale marks 41 extending along the circumferential direction of the adjusting portion. By providing the scale marks 41, the accurateness and convenience of adjustment of the adjustment mechanism 40 by a user can be improved, allowing the user to record, and clearly and quickly acquire the adjustment extent. The adjusting portion may be further provided with numerals in cooperation with the scale marks to determine a corresponding position of adjustment. Optionally, the base body 10 may be provided with mark(s), which can quickly determine an adjusted position of the adjustor 40, allowing the adjustor to be quickly adjusted to the position in the subsequent operation to improve the adjustment efficiency. As illustrate in FIG. 5, the marks may be located on the upper end surface of the base body 10 and located on one side of the adjusting hole 14. The cooperation of the marks with the scale mark 41, the convenience for determining the adjusted position can be improved.

According to an embodiment of the present disclosure, the adjusting seat 30 includes an adjusting seat body 32 and a connection portion 33. Particularly, the adjusting seat body 32 may be in a columnar shape which extends along the axial direction of the adjustor mounting chamber 12 and may be inserted into the adjustor mounting chamber 12. The adjusting seat body 32 may be provided therein with a first pore channel 34, the first pore channel 34 extends along the axial direction of the adjusting seat body 32. The upper end of the movable unit 300 may extend into the first pore channel 34. An upper end of the adjusting seat body 32 may be provided with a screw hole 35. The lower end of the adjustor 40 may be in a threaded connection with the screw hole 35. By rotation of the adjustor 40, the position of the adjusting seat 30 may be adjusted in the vertical direction. A lateral part of the adjusting seat body 32 may be provided with an avoiding slot 36 in communication with the first pore channel 34. One end of a lever 21 of the executor 20 may extend through the avoiding slot 36 to be connected with the movable unit 300, preventing the adjusting seat body 32 from interfering with the lever 21 of the executor 20 during the vertical movement of the adjusting seat body 32. The connection portion 33 may be connected with the adjusting seat body 32 and may be provided at a lower end of the base body 10. The connection portion 33 may be configured to be connected with the fluid channel assembly of the fluid micro-injection device. The connection portion 33 may be provided therein with a second pore channel. The second pore channel is coaxial with and in communication with the first pore channel 34 in such a manner that the second pore channel cooperates with the first pore channel 34 to form a channel 31. During assembly, the upper end of the movable unit 300 may sequentially extends through the second pore channel and the first pore channel 34 to be connected with the lever 21.

Optionally, the upper end of the connection portion 33 may be provided with a positioning portion 39. The base body 10 may be provided with a positioning recess 18 which cooperates with the positioning portion 39. When assembling the connection portion 33 with the base body 10, at least a portion of the positioning portion 39 may be able to be inserted into the positioning recess 18, to improve the effect of positioning and stability for assembly.

The second pore channel may cooperate with an upper positioning cylindrical post of a guiding seat of the movable unit 300 (closing element) for the fluid channel assembly of the fluid micro-injection device. When the execution system 100 is in close connection with the fluid channel assembly, a lower end surface (a positioning surface) of the connection portion 33 may be in close contact and coincidence with a upper positioning surface of the guiding seat of the closing element (a striker), to restrict position of upward movement of the fluid channel assembly and the execution system 100, guaranteeing the axis of the guiding seat to be completely coaxial with the axis of the positioning hole 13 and perpendicular to the positioning surface (the lower end surface of the connection portion 33), and effectively restricting anterior and rear, left and right positions of the fluid channel assembly and the executor.

The adjustor mounting chamber 12 may be provided therein with an adjusting seat mounting chamber **12*b*. The adjusting seat mounting chamber 12*b* may be located below the subsidence groove 16 and above the positioning hole 13. The upper end of the adjusting seat mounting chamber 12*b* may be in communication with the subsidence groove 16. The lower end of the adjusting seat mounting chamber 12*b* may be in communication with the positioning hole 13. The right side of the adjusting seat mounting chamber 12*b* nay be in communication with the executor mounting chamber 11. The top surface of the adjusting seat mounting chamber 12*b* may cooperate with the upper end surface of the adjusting seat body 32. When the adjusting seat 30 is adjusted to move upwardly, the upper end surface of the adjusting seat body 32 may be in contact with the upper end surface of the adjusting seat mounting chamber 12*b*, effectively preventing the position adjustment of the adjusting seat 30** from going beyond a range.

Optionally, the outer circumferential surface of the lower end of the adjusting seat body 32 close to the connection portion 33 may be provided with a sealing recess **32*a*. A sealing element may be provided within the sealing recess 32*a* to guarantee the internal sealing of the base body 10**.

Optionally, the adjusting seat body 32 may be integral with the connection portion 33, having advantages such as easy to manufacture and process and lower manufacture cost.

Further, there are two avoiding slots 36 which are provided at opposite sides of the adjusting seat body 32. The restrictor 70 includes a second restriction portion 73. The second restriction portion 73 may be provided on the base body 10. At least a portion of the second restriction portion 73 may extend through the avoiding slot 36 to restrict the position of the adjusting seat 30 moving along the axial direction of the movable unit 300. The two avoiding slots 36 may be provided opposite to each other. One end of the lever 21 may extend through one avoiding slot 36 to be connected with the movable unit 300. At least a portion of the second restriction portion 73 may extend through the other avoiding slot 36. When the adjusting seat body 32 moves downward, at least a portion of the second restriction portion 73 may be located in the moving path of the adjusting seat body 32. When the adjusting seat body 32 moves downward by a certain distance, the second restriction portion 73 may prevent the adjusting seat body 32 from keeping on moving downward. Optionally, the lower end of the adjustor 40 may extend through the screw hole 35. The part of the adjustor 40 extending through the screw hole 35 may be arranged apart from the second restriction portion 73, preventing the second restriction portion 73 from interfering with the movement of the lower end of the adjustor 40.

The cross section of the adjusting seat body 32 taken along the axial direction may be formed as square shape. The hollow part of the square-shaped section may correspond to the avoiding slot 36. The upper end of the adjusting seat body 32 may be provided with a screw hole 35. The upper end surface of the adjusting seat body 32 may be in close contact with the lower end surface of the compressing spring 72, facilitating transferring the force acting on the adjusting seat 30 and allowing the adjusting seat 30 to reach a corresponding position in time. Further, when the adjusting seat 30 is adjusted to move upwardly, the upper end surface of the adjusting seat body 32 may be in contact with the top surface of the adjusting seat mounting chamber **12*b*, preventing the adjustment of the adjusting seat 30 from going beyond a range. The surface of the adjusting seat body 32, which is located above the hollow part of the square shape, may cooperate with the second restriction portion 73, which can restrict downward displacement of the adjusting seat 30 when being adjusted, guarantee the position of the adjusting seat 30 to be in the adjustment range, and prevent the adjusting seat 30 from getting off the base body 10 due to over adjustment. The outer circumferential surface of the adjusting seat body 32 may cooperate with the adjusting seat mounting chamber 12***b*, which can guarantee the axis of the adjusting seat 30 to intersect with the axis of a small protruding part on the front end of the lever, so as to produce accurate transfer of force and displacement during adjustment of the adjusting seat 30.

Figure 10:
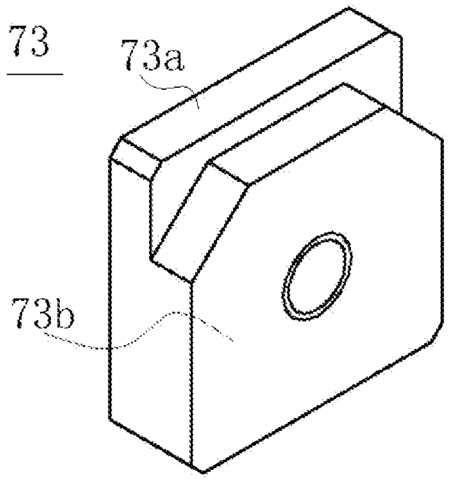
FIG. 10 is a schematic view illustrating a part of a second restriction portion of the fluid micro-injection device according to an embodiment of the present disclosure.

The left side of the adjusting seat mounting chamber 12*b* may be provided with a protruding part extending in a direction towards the channel. The upper end surface of the second restriction portion 73 may be in cooperation with the protruding part 12*c* to restrict the position of the second restriction portion 73 in the vertical direction. The inner sidewall of the adjusting seat mounting chamber 12*b* below the protruding part 12*c* may be installed with the second restriction portion 73, and may be in close contact with the rear flat surface of the second restriction portion 73 to guarantee the installed position of the second restriction portion 73. As illustrated in FIG. 10, the second restriction portion 73 may include a rectangle-shaped mounting plate 73*a* and a restriction plate 73*b* provided on the mounting plate 73*a*. The mounting plate 73*a* and the restriction plate 73*b* may be integrally formed. The left lateral surface of the mounting plate 73*a* may be in cooperation with the inner sidewall of the adjusting seat mounting chamber 12*b* below the protruding part 12*c*. The left lateral surface of the mounting plate 73*a* may be fastened with a screw. The upper end surface of the mounting plate 73*a* may be in cooperation with the protruding part 12*c* on the adjusting seat mounting chamber 12*b* to determine the position of the second restriction portion 73 in the vertical direction. The left lateral surface of the restriction plate 73*b* may be connected with the right lateral surface of the mounting plate 73*a*. The upper end surface of the restriction plate 73*b* may be in cooperation with the upper end of the adjusting seat body 32. Thereby, the downward displacement of the adjusting seat body 32 when being adjusted can be restricted, so as to guarantee the position of the adjusting seat 30 to be in a adjustment range and prevent the adjusting seat 30 from getting off the base body 10 due to over adjustment. The second restriction portion 73 may be provided with a screw hole extending horizontally. The second restriction portion 73 may be fixed to the inner lateral surface of the base body 10 through a screw bolt to accurately fix the restriction of position.

According to an embodiment of the present disclosure, the lever 21 is provided in the executor mounting chamber 11 and both ends of the lever 21 are movable. When assembling the base body 10 with the fluid seat 210, the upper end of the movable element 320 may be connected with a first end of the lever 21 and is driven by the lever 21 to move in the axial direction of the guiding hole 311. The executor 20 may further include an actuator 22 and a controller. The actuator 22 may be telescopically provided in the executor mounting chamber 11. The actuator 22 may be connected with the second end of the lever 21 to control the movement of the lever 21. The controller may be connected with the actuator 22 to control the retractable movement of the actuator 22.

In some specific embodiments of the present disclosure, the inner surface of the adjustor mounting chamber 12 may be provided with a restriction boss 15 which extends along the circumferential direction of the inner surface and which is located below the lever 21. The execution system 100 may further include a positioning seat 50 and a first elastic element 60.

In particular, the positioning seat 50 may be provided in the executor mounting chamber 11. The positioning seat 50 may be in a columnar shape extending along the axial direction of the executor mounting chamber 11, and an upper end of the positioning seat 50 may be provided with a circular boss 51 extending along its circumferential direction. The circular boss 51 presses against the restriction boss 15. The lower end surface of the circular boss 51 of the positioning base 50 may press against the upper end surface of the restriction boss 15 to restrict relative position between the elastic element 60 and the base body 10. When the adjustor 40 drives the adjusting seat 30 to move vertically, the position of the restriction boss 15 relative to the base body 10 can be fixed to restrict the relative position between the positioning base 50 and the base body 10. The positioning seat 50 may be provided with a third pore channel extending therethrough along its axial direction. The upper end of the movable unit 300 may extend through the third pore channel to be connected with the lever 21. The first elastic element 60 may be provided between the lever 21 and the positioning seat 50, and the two ends of the first elastic element 60 may press against the lever 21 and the positioning seat 50 respectively. The part below the circular boss 51 of the positioning seat 50 may be in cooperation with the second pore channel to restrict the axial position of the first elastic element 60, and to allow the axis of the elastic element 60 to be coincident with the axis of the adjusting seat 30. The third pore channel may be in cooperation with the lower end surface of the first elastic element 60 to transfer a counter force to the base body 10 via the positioning seat 50, which guarantees a stable value of the force. The inner radial size of the third pore channel may be in cooperation with the outer radial size of the first elastic element 60 to guarantee a stable position of the first elastic element 60.

Further, the first elastic element 60 may be a spring sheathed on the outer circumferential surface of the movable element, having advantages such as a broad resource and low cost.

Figure 11:
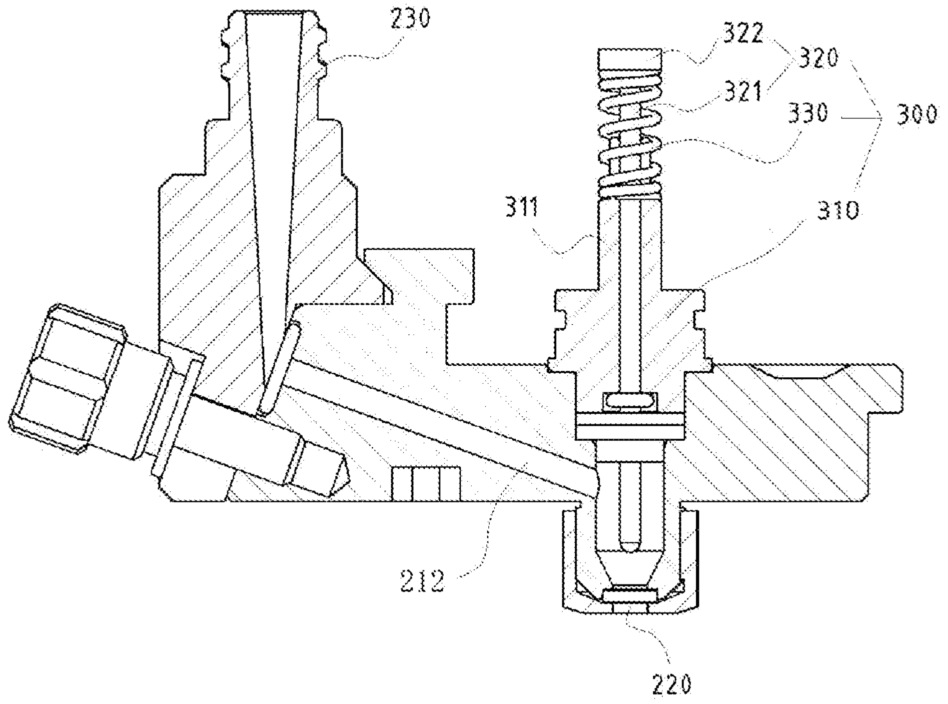
FIG. 11 is a schematic view illustrating the assembly of the fluid channel assembly with the movable element of the fluid micro-injection device according to an embodiment of the present disclosure.
Figure 12:
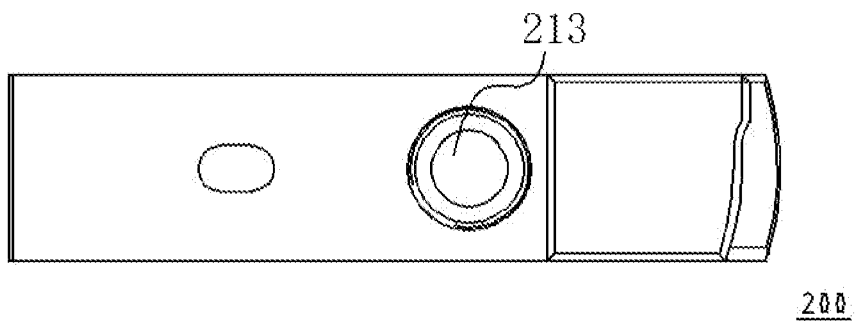
FIG. 12 is a top view of the fluid channel assembly of the fluid micro-injection device according to an embodiment of the present disclosure.
Figure 13:
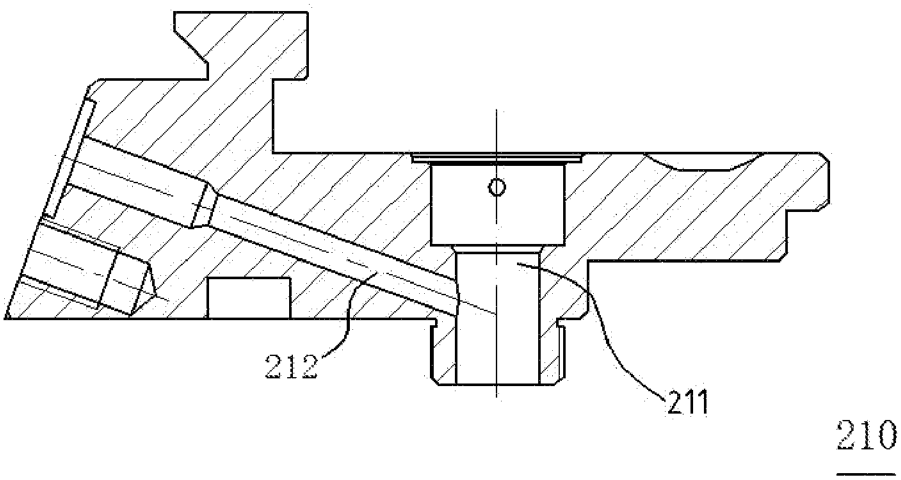
FIG. 13 is a sectional view of the fluid channel assembly of the fluid micro-injection device according to an embodiment of the present disclosure.

As illustrated in FIG. 11 to FIG. 13, according to an embodiment of the present disclosure, the fluid seat 210 may defines therein an installation chamber 213 in communication with the fluid chamber 211. The movable unit 300 may include a guiding seat 310, a movable element 320 and a second elastic element 330.

In particular, the guiding seat 310 may be in a columnar shape. The guiding seat 310 defines therein a guiding hole 311 extending through the guiding seat along the axial direction of the guiding seat. The lower end of the guiding seat 310 may be detachably installed into the installation chamber 213. Other parts of the guiding seat 310 may extend into the positioning hole 13 when the fluid channel assembly 200 is assembled with the execution system 100. The movable element 320 is movable along an axial direction of the guiding seat 310, and a lower end of the movable element 320 may extend through and out of the guiding hole 311 along the axial direction of the guiding seat 310. An upper end of the movable element 320 may be located above the guiding seat 310. When assembling the execution system 100 with the fluid channel assembly 200, the upper end of the movable element 320 may extend through the channel 31 and into the adjustor mounting chamber 12 to be connected with at least a portion of the executor 20 and to be controlled by the executor 20 to move along the axial direction of the guiding hole 311. The lower end of the movable element 320 may cooperate with the nozzle 220 to open and close the nozzle 220. The adjustor 40 may adjust the movement of the adjusting seat 30 along the axial direction of the movable element 320, and drive the movable element 320 to move along its axial direction. The second elastic element 330 may be provided between the upper end of the guiding seat 310 and the upper end of the movable element 320, and the two ends of the second elastic element 330 may press against the upper end of the guiding seat 310 and the upper end of the movable element 320 respectively.

Optionally, an upper part of the guiding seat 310 is in a cylindrical shape. The upper end of the guiding seat 310 may be provided with a positioning pin, the positioning pin is coaxial with the guiding seat 310 and has a radial size smaller than that of the guiding seat 310. The first elastic element may be a spring sheathed on the positioning pin. The positioning hole 13 may be a cylindrical hole. When assembling the guiding seat 310 with the base body 10, an outer circumferential surface of the upper part of the guiding seat 310 may be in close contact with the inner surface of the positioning hole 13.

Further, the movable element 320 may include a cylindrical shaft 321 and an upper end platform 322. The cylindrical shaft 321 may be provided in the guiding hole 311 and is movable along its axial direction. A lower end of the cylindrical shaft 321 may be formed as a sphere head. The upper end platform 322 may be provided at the upper end of the cylindrical shaft 321. The upper end platform 322 may have a size greater than the radius of the cylindrical shaft 321. The second elastic element 330 may be provided between the upper end platform 322 and the guiding seat 310.

The assembling process and the assembling characteristics of the execution system 100 of the fluid micro-injection device according to embodiments of the present disclosure will be described in detail in the following.

At S1, the adjustor 40 is installed into the adjusting hole 14, the compressing spring 72 is installed into the subsidence groove 16 from the positioning hole 13, so as to make the compressing spring 72 to be in cooperation with the adjustor 40.

At S2, the adjusting seat 30 is installed from the positioning hole 13, and the screw thread at the lower end of the adjustor 40 is in a threaded connection with the screw hole 35 of the adjusting seat 30 to make the upper flat surface of the adjusting seat 30 to be in close contact with the top surface of the adjusting seat mounting chamber 12*b*.

At S3, the second restriction portion 73 is put into the adjusting seat mounting chamber 12*b*.

At S4, the positioning seat 50 is assembled with the adjusting seat 30, to make the circular boss 51 of the positioning seat 50 to cooperate the restriction boss 15, and the first elastic element is installed into the positioning seat 50.

At S5, the executor 20 is installed into the executor mounting chamber 11, the rear end of the lever is assembled with a swing axle pin, and the front end of the lever may be in close contact with the upper end surface of the first elastic element 60.

At S6, the actuator 22 is installed into the executor mounting chamber 11, and the lower part of the actuator 22 may be in cooperation with the rear end of the lever, and the adjustment range can be restricted to avoid damage to the piezoelectric actuator and to extend its use life.

At S7, the upper positioning cylinder of the guiding seat 310 is inserted into the second pore channel, and the fluid channel assembly 200 is rotated for assembly.

The fluid micro-injection device according to embodiments of the present disclosure includes the execution system 100 according to the above embodiments, Since the execution system 100 according to the above embodiments of the present disclosure has above-mentioned technical effects, the fluid micro-injection device according to the embodiments of the present disclosure also has the corresponding technical effects, and can overcome problems such as inconvenience and inefficiency in adjustment for contact force between the nozzle 220 and the movable element 320, thereby improving the efficiency for adjustment of piezoelectric valve and the efficiency for manufacture and assembly.

Other structure and operation of the fluid micro-injection device according to embodiments of the present disclosure are easy to understand and implement for a person skilled in the art, the detailed description related thereto are omitted here.

In the description of the present specification, the description with reference to the terms "an embodiment", "some embodiments", "illustrative embodiment", "example", "specific example", or "some examples", etc. refer to particular features, structures, materials or characteristics described in the embodiments or examples included in at least an embodiment or example of the present disclosure. In the present specification, the schematic representation of the above terms does not necessarily mean the same embodiment or example. Furthermore, described particular features, structures, materials or characteristics may be combined in a suitable manner in any one or more embodiments or examples. Although the embodiments of the present disclosure have been shown and described above, it can be appreciated by those skilled in the art that various changes, modifications, replacements and variants can be made to the above embodiments without departing from the principle and spirit of the present disclosure. The scope of the present disclosure is defined by the claims and their equivalents.

What is claimed is:

1. A fluid micro-injection device, comprising:

an execution system, the execution system comprising:

- a base body defining therein an executor mounting chamber and an adjustor mounting chamber, the base body being provided with a positioning hole in communication with the executor mounting chamber;
- an executor movably provided in the executor mounting chamber, at least a portion of the executor extending into the adjustor mounting chamber;
- an adjusting seat, at least a portion of the adjusting seat extending through the positioning hole and into the adjustor mounting chamber, and the adjusting seat being provided with a channel in communication with the executor mounting chamber; and
- an adjustor movably provided in the adjustor mounting chamber, at least a portion of the adjustor being connected with the adjusting seat to adjust the distance between the adjusting seat and the executor;
- a fluid channel assembly, the fluid channel assembly comprising:
- a fluid seat, the fluid seat defining therein a fluid chamber and a fluid channel in communication with the fluid chamber, the base body being detachably connected with the fluid seat;
- a nozzle provided on the fluid seat and in communication with the fluid chamber; and
- a fluid supply joint in communication with the fluid channel to supply fluid to the nozzle through the fluid channel and the fluid chamber; and a movable unit provided between the base body and the fluid seat, at least a first portion of the movable unit being inserted into the positioning hole to be connected with the executor and driven by the executor to move along an axis of the positioning hole to open and close the nozzle, and at least a second portion of the movable unit being provided on the adjusting seat to be adjusted by the adjusting seat, wherein the adjusting seat comprises an adjusting seat body which is in a columnar shape extending along the axial direction of the adjustor mounting chamber and which is inserted into the adjustor mounting chamber, wherein an inner surface of the adjustor mounting chamber is provided with a circular subsidence groove extending along a circumferential direction of the inner surface, a radial size of an opening at a lower end of the circular subsidence groove is smaller than a radial size of an upper end of the adjusting seat body, and the execution system further comprises:

a compressing spring provided in the circular subsidence groove, the compressing spring being an elastic element, and two ends of the compressing spring being compressed against a top surface of the circular subsidence groove and an upper end surface of the adjusting seat respectively.

2. The fluid micro-injection device of claim 1, wherein the base body is provided with an adjusting hole in communication with the adjustor mounting chamber, an upper end of the adjustor extends out of the adjusting hole, and a lower end of the adjustor is connected with the adjusting seat.

3. The fluid micro-injection device of claim 2, wherein the adjustor mounting chamber is formed as a chamber which extends in a vertical direction and which is open at both upper and lower ends thereof, the adjustor mounting chamber is open at its upper end to form the adjusting hole, the adjustor mounting chamber is open at its lower end to form the positioning hole, and the adjustor is connected with the adjusting seat to drive the adjusting seat to move in the vertical direction.

4. The fluid micro-injection device of claim 3, wherein the adjustor is in a columnar shape extending along an axial direction of the adjustor mounting chamber, the lower end of the adjustor is provided with a screw pin, a part of the adjusting seat extending into the adjustor mounting chamber is provided with a screw hole corresponding to the screw pin, and the adjustor is rotatable along its axis to drive the adjusting seat to move in the vertical direction.

5. The fluid micro-injection device of claim 4, wherein the adjusting seat body being provided therein with a first pore channel extending along its axial direction, an upper end of the movable unit extending into the first pore channel, an upper end of the adjusting seat body being provided with the screw hole, a lateral part of the adjusting seat body being provided with an avoiding slot in communication with the first pore channel, and one end of a lever of the executor extends through the avoiding slot to be connected with the movable element; and a connection portion connected with the adjusting seat body and provided at a lower end of the base body, the connection portion being configured to be connected with the fluid channel assembly of the fluid micro-injection device, the connection portion is provided therein with a second pore channel which is coaxial with and in communication with the first pore channel, and the second pore channel cooperating with the first pore channel to form the channel.

6. The fluid micro-injection device of claim 5, wherein the inner surface of the adjustor mounting chamber is provided with a restriction boss, the restriction boss extends along a circumferential direction of the inner surface and is located below the lever, and wherein the execution system further comprises:

a positioning seat provided in the executor mounting chamber, the positioning seat being in a columnar shape extending along the axial direction of the executor mounting chamber, an upper end of the positioning seat being provided with a circular boss extending along its circumferential direction, the circular boss pressing against the restriction boss, the positioning seat being provided with a third pore channel extending therethrough along its axial direction, and the upper end of the movable unit extending through the third pore channel to be connected with the lever; and a first elastic element provided between the lever and the positioning seat, two ends of the first elastic element pressing against the lever and the positioning seat respectively.

7. The fluid micro-injection device of claim 6, wherein the fluid seat defines therein an installation chamber in communication with the fluid chamber, and the movable unit comprises:

a guiding seat which is in a columnar shape, the guiding seat defining therein a guiding hole, the guiding hole extending through the guiding seat along the axial direction of the guiding seat, an lower end of the guiding seat being configured to be detachably installed into the installation chamber, and other parts of the guiding seat being configured to extend into the positioning hole when assembling the fluid channel assembly with the execution system;

a movable element which is movable along an axial direction of the guiding seat, a lower end of the movable element extending through and out of the guiding hole along the axial direction of the guiding seat, an upper end of the movable element being located above the guiding seat, the upper end of the movable element being configured to extend through the channel and into the adjustor mounting chamber to be connected with at least a portion of the executor and to be controlled by the executor to move along the axial direction of the guiding hole when assembling the execution system with the fluid channel assembly, the lower end of the movable element cooperating with the nozzle to open and close the nozzle, and the adjustor being configured to adjust the movement of the adjusting seat along the axial direction of the movable element and to drive the movable element to move along its axial direction; and a second elastic element provided between a upper end of the guiding seat and the upper end of the movable element, two ends of the second elastic element pressing against the upper end of the guiding seat and the upper end of the movable element respectively.

8. The fluid micro-injection device of claim 7, wherein an upper part of the guiding seat is in a cylindrical shape, the upper end of the guiding seat is provided with a positioning pin which is coaxial with the guiding seat and has a radial size smaller than that of the guiding seat, the first elastic element is a spring sheathed on the positioning pin, the positioning hole is a cylindrical hole, and an outer circumferential surface of the upper part of the guiding seat is in close contact with the inner surface of the positioning hole when assembling the guiding seat with the base body.

9. The fluid micro-injection device of claim 7, wherein the movable element comprises:

a cylindrical shaft, provided in the guiding hole and movable along its axial direction, and an lower end of the cylindrical shaft being formed as a sphere head; and an upper end platform provided at an upper end of the cylindrical shaft, the upper end platform having a size greater than the radius of the cylindrical shaft, the second elastic element being provided between the upper end platform and the guiding seat.

10. The fluid micro-injection device of claim 5, wherein the execution system further comprises:

a restrictor provided on the base body and connected with at least a portion of the adjustor and/or the adjusting seat, the restrictor being configured to at least restrict a position of the adjusting seat moving along the axial direction of the movable unit or a position of the adjustor.

11. The fluid micro-injection device of claim 10, wherein the adjustor is provided with a recess extending along a circumferential direction of the adjustor, and the restrictor comprises:

a first restriction portion provided on the base body and positioned in the adjustor mounting chamber, at least a portion of the first restriction portion being inserted into the recess to restrict the position of the adjustor.

12. The fluid micro-injection device of claim 11, wherein a right side of the recess is in communication with the executor mounting chamber, an upper end surface of the recess is configured to cooperate with an upper end surface of the first restriction portion to restrict displacement of the first restriction portion in the axial direction.

13. The fluid micro-injection device of claim 11, wherein the first restriction portion is formed as a U-shaped element with an opening, an inner surface of the U-shaped element is configured to cooperate with an inner surface of the recess.

14. The fluid micro-injection device of claim 10, wherein the number of the avoiding slots is two and the two avoiding slots are provided at opposite sides of the adjusting seat body, and the restrictor comprises:

a second restriction portion provided on the base body, at least a portion of the second restriction portion extending through the avoiding slot to restrict the position of the adjusting seat moving along the axial direction of the movable element.

15. The fluid micro-injection device of claim 14, wherein one end of the lever extends through one avoiding slot to be connected with the movable unit, at least a portion of the second restriction portion extends through the other avoiding slot, and when the adjusting seat body moves downward, at least a portion of the second restriction portion is located in a moving path of the adjusting seat body.

16. The fluid micro-injection device of claim 5, wherein an upper end of the connection portion is provided with a positioning portion, the base body is provided with a positioning recess which is configured to cooperate with the positioning portion, at least a portion of the positioning portion is inserted into the positioning recess when the connection portion is assembled with the base body.

17. The fluid micro-injection device of claim 2, wherein an upper end of the adjusting hole is provided with a subsidence groove extending along an inner surface of the adjusting hole, a sealing ring is provided in the subsidence groove within the adjusting hole, and the upper end of the adjustor is configured to extend through the sealing ring and into the adjustor mounting chamber.

18. The fluid micro-injection device of claim 2, wherein the upper end of the adjustor is formed as an adjusting portion, and the adjusting portion is provided with scale marks extending along an circumferential direction of the adjusting portion.

19. The fluid micro-injection device of claim 1, wherein the adjustor mounting chamber is provided therein with an adjusting seat mounting chamber, the adjusting seat mounting chamber is located below the circular subsidence groove and above the positioning hole, an upper end of the adjusting seat mounting chamber is in communication with the circular subsidence groove, a lower end of the adjusting seat mounting chamber is in communication with the positioning hole, a right side of the adjusting seat mounting chamber is in communication with the executor mounting chamber, and a top surface of the adjusting seat mounting chamber is configured to cooperate with an upper end surface of the adjusting seat body.

* * * * *